United States Patent Office 3,075,981
Patented Jan. 29, 1963

3,075,981
1-[AROMATIC-(LOWER-ALKYL)]-4-(AROMATIC-IMINO) - 1,4 - DIHYDROQUINOLINES AND THEIR PREPARATION
Alexander R. Surrey, Albany, N.Y., assignor to Sterling Drug Inc., New York, N.Y., a corporation of Delaware
No Drawing. Filed Apr. 3, 1958, Ser. No. 726,055
17 Claims. (Cl. 260—256.4)

This invention relatse to compositions of matter of the class of basic quinoline derivatives, to their acid-addition salts, and to the preparation of these compounds.

The invention here resides in a composition of matter selected from the group consisting of: (a) a 1,4-dihydroquinoline that is substituted by an aromatic-(lower-alkyl) radical at the 1-position and by an aromatic-imino radical at the 4-position, and that can be further substituted by from one to two other substituents selected from the group consisting of halo, lower-alkoxy, lower-alkylmercapto, lower-alkyl, nitro and trifluoromethyl radicals at one of the normally aromatic positions of the quinoline nucleus, and, optionally, by a lower-alkyl substituent at the 2-position of the quinoline nucleus; and, (b) acid-addition salts thereof.

Among the compounds of my invention are those which in free base form are represented by the structural Formula I

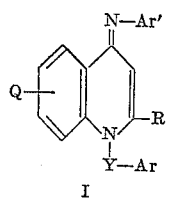

I where Q represents H or from one to two substituents at positions 3, 5, 6, 7 and 8 of the quinoline nucleus selected from the group consisting of halo, lower-alkoxy, lower-alkylmercapto, lower-alkyl, nitro and trifluoromethyl radicals; Ar' and Ar are each an aromatic radical including phenyl, naphthyl, biphenylyl, thienyl, furyl, pyridyl and pyrimidyl radicals; R is H or a lower-alkyl radical; and Y is a lower-alkylene radical.

In the above general Formula I the quinoline nucleus can be unsubstituted at the positions other and 1 and 4 or it can be substituted further at one to two of the normally aromatic positions of the quinoline ring, namely, 3, 5, 6, 7 or 8, by the substituents named above. When Q designates two substituents, they can be the same or different and can be in any of said available aromatic positions relative to each other. The halo substituents can be chloro, bromo, iodo or fluoro. The lower-alkoxy, lower-alkylmercapto and lower-alkyl substituents have preferably from one to six carbon atoms and includes: methoxy, ethoxy, n-propoxy, isopropoxy, n-butoxy, isobutoxy, 2-butoxy, n-pentoxy, n-hexoxy and the like when lower-alkoxy; methylmercapto, ethylmercapto, n-propylmercapto, isobutylmercapto, n-hexylmercapto and the like when lower-alkylmercapto; and methyl, ethyl, n-propyl, isopropyl, n-butyl, n-hexyl and the like when lower-alkyl.

The quinoline nucleus can be further substituted at the 2-position by a lower-alkyl radical represented above as R and illustrated by methyl, ethyl, n-propyl, isobutyl, n-butyl, n-hexyl and the like.

The lower-alkylene radical designated above as Y can have preferably from one to four carbon atoms and is illustrated by —CH$_2$—, —CH$_2$CH$_2$—, —CH(CH$_3$)CH$_2$—
—CH$_2$CHCH$_3$, —C(CH$_3$)$_2$CH$_2$—, —CH$_2$CHCH$_2$CH$_3$
—CH$_2$CH$_2$CH$_2$—, —CH(CH$_3$(CH$_2$CH$_2$—, —CH$_2$CH$_2$CH$_2$CH$_2$— and the like.

The aromatic radicals designated above as Ar and Ar' can be the same or different and preferably stand for monocarbocyclic-aryl radicals having six ring-carbon atoms, i.e., aryl radicals of the benzene series. These preferred embodiments thus include the unsubstituted-phenyl radical and phenyl radicals substituted by substituents including halo, nitro, lower-alkoxy, hydroxy, lower-alkyl, lower-alkylmercapto, lower-alkylsulfonyl, trifluoromethyl, lower-alkylamino, di-(lower-alkyl)amino, lower-acylamino, and the like. The substituted-phenyl radicals have preferably from one to three substituents including those given above; and, furthermore, these substituents can be in any of the available positions of the phenyl nucleus, and where more than one substituent, they can be the same or different and they can be in any of the various position combinations relative to each other. Thus Ar and Ar' when standing for preferred embodiments comprehend the unsubstituted-phenyl radical as well as substituted-phenyl radicals illustrated by: nitrophenyl radicals including 4-nitrophenyl, 3-nitrophenyl, 2-nitrophenyl, etc.; (lower-alkoxylated)-phenyl including 3-ethoxyphenyl, 2-methoxyphenyl, 2,4-dimethoxyphenyl, 2,4,6-trimethoxyphenyl, 3,4-diethoxyphenyl, etc.; (lower-alkylated)-phenyl including 4-methylphenyl 3-ethylphenyl, 2-methylphenyl, 2,4-dimethylphenyl, 3,4,5-trimethylphenyl, 4-isopropylphenyl, etc.; halogenated-phenyl including 2-chlorophenyl, 4-chlorophenyl, 2,4-dibromophenyl, 3-iodophenyl, 2,4-dichlorophenyl, 3,4-dichlorophenyl, 2,4,6-trichlorophenyl, 4-fluorophenyl, etc.; and other substituted-phenyl radicals including 3-trifluoromethylphenyl, 4-methylmercaptophenyl, 4-methylsulfonylphenyl, 4-n-butylaminophenyl, 4-hydroxyphenyl, 4-diethylaminophenyl, 2-chloro-4-ethoxyphenyl, 4-acetylaminophenyl, and the like.

Particularly preferred embodiments of my invention are compounds of the above Formula I and their acid-addition salts of Formula II where Q is a halo radical, Ar' is a halogenated-phenyl or (lower-alkoxylated)-phenyl radical, R is H, Y is CH$_2$ and Ar is a halogenated-phenyl radical.

Preferred embodiments are my compounds in the form of their acid-addition salts, which can be represented by the general structural Formula II

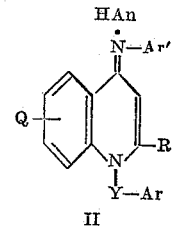

II where Q, Ar', R, Y and Ar have the means designated above and An is an anion.

The anion designated above as An can be any anion and is preferably a chemotherapeutically acceptable anion, for instance, chloride, bromide, iodide, sulfate, phosphate, sulfamate, benzenesulfonate, para-toluenesulfonate, methanesulfonate, ethanesulfonate, citrate, tartrate, and the like; the anion has no appreciable activity of its own in the high dilutions at which the acid-addition salts as a whole are effective. In particular, the anions appear to contribute nothing to the chemotherapeutic properties which inhere to the cation portion of the substituted-1,4-dihydroquinolines of the present invention. However, preferred compounds are those in which An is hailde, in particular, chloride, iodide or bromide, since these are derived from readily available starting materials. By a chemotherapeutically acceptable anion, I mean any anion which is innocuous to the animal organism in chemotherapeutic doses of the acid-addition salt, so that beneficial physiological properties inherent in the cation are not vitiated by any possible side-effects ascribable to the anions; in other words, the latter do not substantially affect the chemotherapeutic properties inherent in the cations.

The acid-addition salts are prepared directly as described hereinafter or they are prepared from the free base either by dissolving the free base in an aqueous alkanol solution containing the appropriate acid and isolating the salt by evaporating the solution, or by reacting the free base and acid in an organic solvent, e.g., a lower alkanol, in which case the salt separates directly or can be obtained by concentration of the solution. Alternatively, the acid-addition salts can be prepared by treating an acid-addition salt (Formula II) prepared directly as noted above with an anion exchange resin saturated with the desired anion.

Although chemotherapeutically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a chemotherapeutically acceptable salt by ion exchange procedures.

Concerning the structure of the acid-addition salts represented above as Formula II, the following considerations are presented. From chemical and physical data it appears that structure II is actually a resonance hybrid whose main contributing structures are represented as follows as A⇌B:

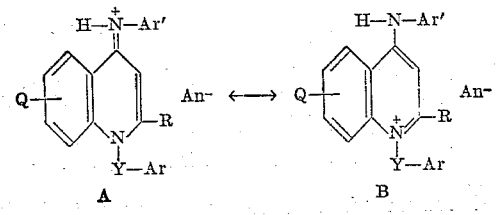

Since my compounds in free base from (Formula I) are readily obtained from their acid-addition salts by reaction with an acid-acceptor, as shown below, and since they are readily reconverted into their acid-addition salts by treatment with an acid, I prefer to represent the acid salt form by Formula II. As an illustration, I prefer to represent the hydrochloride salt of 7-chloro-1-(2-chlorobenzyl)-4-(4-chlorophenylimino)-1,4-dihydroquinoline by the following structural Formula IIa:

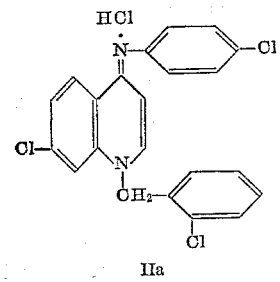

Alternatively, this compound can be named 7-chloro-1-(2-chlorobenzyl)-4-(4-chlorophenylamino)quinolinium chloride or 7-chloro-4-(4-chlorophenylamino)quinoline 2-chlorobenzochloride and can be represented by the structural Formula IIb:

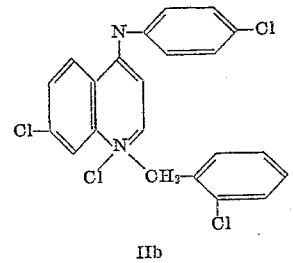

Thus, it is to be understood that although I prefer to represent the acid-addition salt form of my compounds by the structural formula designated above as II, i.e., as an acid-addition salt of a 1-[aromatic-(lower-alkyl)]-4-(aromatic-imino)-1,4-dihydroquinoline, this 4-imino-1,4-dihydroquinoline structure actually represents only one of the contributing members of a resonance hybrid; and, further, it is to be understood that the salt form of my invention comprehends not only this 4-imino-1,4-dihydroquinoline structure (as specifically illustrated above as IIa) but also other contributing members of the resonance hybrid including the 1-[aromatic-(lower-alkyl)]-4-(aromatic-amino)-quinolinium salt structure (as specifically illustrated above as IIb).

The compounds of Formula II are conveniently prepared by reacting the corresponding 4-(aromatic-amino)-quinoline having the Formula III

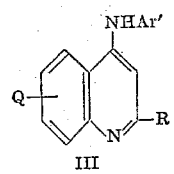

where Q, Ar' and R have the meanings designated above, with an aromatic-(lower-alkyl) ester of the formula Ar—Y—An, where Ar, Y and An have the meanings given above, and if the compounds of Formula I are desired, then reacting the resulting acid-addition salt of the 1 - [aromatic-(lower-alkyl)]-4-(aromatic-imino)-1,4-dihydroquinoline salt (Formula II above) with an acid-acceptor to yield the product in free base form (Formula I). Thus, the reaction of 7-chloro-4-(-chlorophenylamino)quinoline with 4-chlorobenzyl chloride yields the hydrochloride of 7-chloro-1-(4-chlorobenzyl)-4-(3-chlorophenylimino)-1,4-dihydroquinoline which when treated with an acid-acceptor yields 7-chloro-1-(4-chlorobenzyl)-4-(3-chlorophenylimino)-1,4-dihydroquinoline.

The step of reacting the 4-(aromatic-amino)-quinoline (Formula III) with the ester Ar—Y—An is carried out preferably by heating the reactants between about 50° C. and 150° C., a particularly preferred range being between about 80° C. and 120° C. The reaction can be run below 50° C., but it takes longer. The reaction is carried out preferably in an organic solvent which is inert under the conditions of the reaction as for example, acetonitrile, acetone, ethanol, 2-propanol, and the like. When an inert solvent is used, the product usually separates from solution upon cooling, or can be obtained by concentration of the solution. The reaction takes place most readily with aromatic-(lower-alkyl) esters Ar—Y—An where An is the anion of a strong inorganic acid or an organic sulfonic acid. The chloride, bromide or iodide are preferred because of the more ready availability of the requisite aromatic-(lower-alkyl) halides. Compounds where the anion An is other than halogen or anions of strong acids can be prepared by reacting the free base form of my compounds having Formula I with the appropriate acid according to the procedure described above.

The step of reacting the acid-addition salt of the 1-[aromatic - (lower-alkyl)]- 4 - (aromatic-imino)-1,4-dihydroquinoline (Formula II) with an acid-acceptor is carried out at room temperature or by warming, if necessary. The reaction can be carried out in an aqueous or organic solvent; however, it is preferably carried out in an organic solvent inert under the conditions of the reaction as for example, anhydrous methanol, ethanol, and the like. The purpose of the acid-acceptor is to take up the hydrogen halide (or HAn) which is split out during the course of the reaction. The acid-acceptor is a basic substance which preferably forms freely water-soluble by-products easily separable from the product of the reaction, including for example, sodium hydroxide, potassium hydroxide, sodium carbonate, potassium carbonate, sodium acetate, sodium alkoxides, potassium alkoxides, sodium amide, and the like.

The compounds of Formulas I and II can also be prepared by reacting the corresponding 4-haloquinolinium halide having the Formula IV

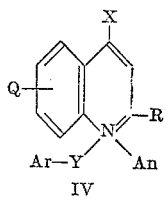

IV where Q, R, Y and Ar have the meanings designated above, An is a halide ion and X is a chloro, bromo or iodo radical, with an aromatic-amine of the formula Ar'—$NH_2$ and reacting the resulting HAn acid-addition salt (Formula II) with an acid-acceptor to yield the product in free base form (Formula I). Thus, the reaction of 7-bromo-1-(2-chloro-4-ethoxybenzyl)-4-iodoquinolinium iodide with 4-n-butoxyphenylamine (i.e., para-n-butoxyaniline) yields the hydroiodide of 7-bromo-4-(4-n-butoxyphenylimino)-1-(2-chloro - 4 - ethoxybenzyl)-1,4-dihydroquinoline; and, the corresponding compound in free base form is obtained by treating the hydroiodide salt with an acid-acceptor as described above.

The reaction of the 4-haloquinolinium halide (Formula IV) with an aromatic-amine Ar'—$NH_2$ is carried out preferably by heating the reactants at a temperature between about 50° C. and 150° C., preferably between about 75 and 125° C.; the reaction can be run at room temperature, but it takes longer. The reaction is preferably carried out in an organic solvent which is inert under the conditions of the reaction as for example, ethanol, and the like. If an inert solvent is used, the product usually separates from solution upon cooling, or can be obtained by concentration of the solution.

Evaluation of the 1-(aromatic-alkyl)-4-aromatic-imino-1,4-dihydroquinolines and salts by standard test procedures has shown that they have useful chemotherapeutic properties, in particular, amebacidal activity as determined in hamsters.

The following examples will further illustrate the invention without, however, limiting it thereto.

EXAMPLE 1

A. *4-(Aromatic-Amino)-Quinolines*

These intermediate compounds are generally known and are prepared by reacting an aromatic-amine with a 4-haloquinoline, as illustrated by the following synthesis of 7-chloro-4-(2,4-dichlorophenylamino)quinoline:

A mixture of 32 g. of 4,7-dichloroquinoline and 26 g. of 2,4-dichloroaniline was heated on a steam bath for about fifteen hours. The reaction mixture was dissolved in refluxing ethanol and the ethanol solution was chilled in a refrigerator. The precipitate was collected and dried at 70° C. for 20 mm. for about eighteen hours to yield 43.5 g. (76% yield) of 7-chloro-4-(2,4-dichlorophenylamino)quinoline in the form of its hydrochloride salt, M.P. 274.0–278.6° C. (corr.).

*Analysis.*—Calcd. for $C_{15}H_9Cl_3N_2.HCl$: Cl, 9.84; N, 7.78. Found: Cl, 9.55; N, 7.73.

Other new 4-(aromatic-amino)-quinolines that were prepared and characterized following the foregoing procedure are the following: 7-chloro-4-(2-chlorophenylamino)quinoline, M.P. 151–152° C. [*Analysis.*—Calcd. for $C_{15}H_{12}Cl_2N_2$: N, 4.85. Found: N, 4.87]; 7-chloro-4-(3-pyridylamino)quinoline, M.P. 185.8–189.0° C. (corr.) [*Analysis.*—Calcd. for $C_{14}H_{10}ClN_3$: Cl, 13.88; N, 10.94. Found: Cl, 13.86; N, 10.82]; 7-chloro-4-(2-pyridylamino)quinoline, M.P. 171.6–173.8° C. (corr.) [*Analysis.*—Calcd. for $C_{14}H_{10}ClN_3$: Cl, 13.86; $N_{AP}$, 10.90. Found: Cl, 14.01; $N_{AP}$, 11.01] and HCl salt, M.P. 308–310° C. with decomposition; 7-chloro-4-(2-pyrimidylamino)quinoline, M.P. 213.6–216.2° C. (corr.) [*Analysis.*—Calcd. for $C_{13}H_9ClNO_4$: Cl, 13.82; N, 21.82. Found: Cl, 13.83; N, 21.98]; 7-chloro-4-phenylaminoquinoline phosphate, M.P. 263.5–265° C. with decomposition [*Analysis.*—Calcd. for $C_{15}H_{11}ClN_2.H_3Po_4$: $H_3PO_4$, 27.79; base, 72.2. Found: $H_3PO_4$, 27.84; base, 72.6]; 7-chloro-4-(4-methoxyphenylamino)quinoline hydrochloride, M.P. 292–294° C. [*Analysis.*—Calcd. for $C_{16}H_{13}ClN_2O.HCl$: N, 8.72. Found: N, 8.94]; and 7-chloro-4-(4-dimethylaminophenylamino)quinoline, M.P. 263–265° C. with decomposition [*Analysis.*—Calcd. for $C_{17}H_{16}ClN_3$: Cl, 11.52; N, 13.65. Found: Cl, 11.66; N, 13.77].

Other 4-(aromatic-amino)-quinolines that can be prepared following the above procedure for the preparation of 7-chloro-4-(2,4-dichlorophenylamino)quinoline using the appropriate 4-haloquinoline and aromatic-amine are:

4-(3-chlorophenylamino)-6,7-dichloroquinoline;
7-chloro-4-(3,4-dichlorophenylamino)-quinoline;
7-bromo-4-(4-n-butoxyphenylamino)quinoline;
4-(2-methoxyphenylamino)-3-nitroquinoline;
5-chloro-4-(4-nitrophenylamino)quinoline;
4-(4-n-butylmercaptophenylamino)-6,8-dimethoxyquinoline;
8-n-butoxy-4-(4-n-butylsulfonylphenylamino)quinoline;
6-n-hexoxy-4-(3-trifluoromethylphenylamino)quinoline;
8-isobutylmercapto-4-(4-n-propylaminophenyl)quinoline;
7-chloro-4-(4-diethylaminophenylamino)-6-methoxyquinoline;
4-(2-chloro-4-ethoxyphenylamino)-7-trifluoromethylquinoline;
7-methyl-4-(3,4,5-tribromophenylamino)quinoline;
7-iodo-4-(4-iodophenylamino)quinoline;
7-chloro-4-(4-fluorophenylamino)-3-nitroquinoline;
7-chloro-4-(1-naphthylamino)quinoline;
4-(4-biphenylamino)-7-chloroquinoline;
7-chloro-4-(2-thienylamino)quinoline;
7-chloro-4-(2-furylamino)quinoline;
7-chloro-4-(5-chloro-2-pyridylamino)quinoline;
6,8-dichloro-4-phenylaminoquinoline;
7-chloro-4-(4-ethoxyphenylamino)quinoline;
7-chloro-4-(4-chlorophenylamino)quinoline; and the like.

B. *4-(Aromatic-Imino)-1-[Aromatic-(Lower-Alkyl)]1,4-Hydroquinolines*

The preparation of these compounds by reacting a 4-(aromatic-amino)-quinoline with an aromatic-(lower-alkyl) ester Ar—Y—An is illustrated by the following preparation of 7-chloro-1-(2-chlorobenzyl-4-(4-chlorophenylimino)-1,4-dihydroquinoline hydrochloride and corresponding base:

A solution containing 14.5 g. of 7-chloro-4-(4-chlorophenylamino)quinoline, 32 g. of 2-chlorobenzyl chloride and 200 cc. of acetonitrile was refluxed for eighteen hours with stirring. The reaction mixture was allowed to cool and the resulting precipitate was collected and recrystallized twice from ethanol to yield 8.0 g. (35.5% yield) of 7-chloro-1-(2-chlorobenzyl) - 4 - (4-chlorophenylimino)-1,4-dihydroquinoline hydrochloride, M.P. 288.6–293.6° C. (corr.).

*Analysis.*—Calcd. for $C_{22}H_{15}Cl_3N_2 \cdot HCl$: Cl, 31.51; N, 6.22. Found: Cl, 31.71; N, 6.15.

Alternatively, as discussed hereinabove, 7-chloro-1-(2-chlorobenzyl)-4-(4 - chlorophenylimino) - 1,4 - dihydroquinoline hydrochloride can be called 7-chloro-1-(2-chlorobenzyl) - 4 - (4 - chlorophenylamino)quinolinium chloride.

7-chloro-1 - (2 - chlorobenzyl) - 4 - (4 - chlorophenylimino)-1,4-dihydroquinoline hydrochloride is converted into its free base form, i.e., 7-chloro-1,(2-chlorobenzyl)-4-(4-chlorophenylimino) - 1,4 - dihydroquinoline, by reaction of the hydrochloride with an acid-acceptor according to the procedure given in Example 24(B) for the conversion of 7-chloro-1-(2-chlorobenzyl)-4 - (4 - methoxyphenylimino)-1,4-dihydroquinoline hydrochloride into its corresponding free base by reaction with aqueous sodium hydroxide solution.

Other 4-(aromatic-imino)-1-[aromatic - (lower-alkyl)]-1,4-dihydroquinolines that can be prepared following the above procedure using the appropriate 4-(aromatic-amino)-quinoline and aromatic-(lower-alkyl) ester of a strong acid include those given in Examples 2–23 inclusive.

EXAMPLE 2

1-benzyl-4 - (3 - chlorophenylimino) - 6,7 - dichloro-1,4-dihydroquinoline hydrobromide using 4-(3-chlorophenylamino)-6,7-dichloroquinoline and benzyl bromide.

EXAMPLE 3

7-chloro-4-(3,4-dichlorophenylimino)-1 - (2 - methoxybenzyl)-2-methyl - 1,4 - dihydroquinoline hydrochloride using 7-chloro-4-(3,4-dichlorophenylamino) - 2 - methylquinoline and 2-methoxybenzyl chloride.

EXAMPLE 4

7 - bromo - 4 - (4 - n - butoxyphenylimino) - 1 - [2-(2,4- dimethoxyphenyl)ethyl] - 1,4 - dihydroquinoline hydrobromide using 7 - bromo - 4 - (4 - n - butoxyphenylamino)quinoline and 2-(2,4-dimethoxyphenyl)ethyl bromide.

EXAMPLE 5

1-(2,4-dibromobenzyl)-4 - (2 - methoxyphenylimino)-3 - nitro - 1,4 - dihydroquinoline hydrobromide using 4-(2-methoxyphenylamino)-3-nitroquinoline and 2,4-dibromobenzyl bromide.

EXAMPLE 6

5 - chloro - 1 - (2 - chloro - 4 - methoxybenzyl)-4-(4-nitrophenylimino) - 1,4 - dihydroquinoline hydrochloride using 5-chloro-4-(4-nitrophenylamino)quinoline and 2-chloro-4-methoxybenzyl chloride.

EXAMPLE 7

4 - (4 - n - butylmercaptophenylimino) - 1 - [4 - (4-chlorophenyl)-butyl] - 6,8 - dimethoxy - 1,4 - dihydroquinoline hydrochloride using 4-(4-n-butylmercaptophenylamino)-6,8-dimethoxyquinoline and 4-(4-chlorophenyl)-butyl chloride.

EXAMPLE 8

8 - n - butoxy - 4 - (4 - n- butylsulfonylphenylimino)-1-(2,4,6 - trichlorobenzyl) - 1,4 - dihydroquinoline hydrochloride using 8-n-butoxy-4-(4 - n - butylsulfonylphenylamino)quinoline and 2,4,6-trichlorobenzyl chloride.

EXAMPLE 9

6-n-hexoxy-1-(4-nitrobenzyl) - 4 - (3 - trifluoromethylphenylimino)-1,4-dihydroquinoline hydrobromide using 6 - n - hexoxy - 4 - (3 - trifluoromethylphenylamino)-quinoline and 4-nitrobenzyl bromide.

EXAMPLE 10

8 - isobutylmercapto -4 - (4 - n - propylaminophenylimino)-1-(3-trifluoromethylbenzyl)-1,4 - dihydroquinoline hydrochloride using 8-isobutylmercapto-4-(4 - n - propylaminophenylamino)quinoline and 3-trifluoromethylbenzyl chloride.

EXAMPLE 11

7 - chloro - 4 - (4 - diethylaminophenylimino) - 6-methoxy - 1 - (4 - n- propylmercaptobenzyl) - 1,4 - dihydroquinoline hydrochloride using 7-chloro-4-(4-diethylaminophenylamino)-6-methoxyquinoline and 4-n-propylmercaptobenzyl chloride.

EXAMPLE 12

4-(2 - chloro - 4 - ethoxyphenylimino) - 1-(4-n-propylsulfonylbenzyl) - 7 - trifluoromethyl-1,4-dihydroquinoline hydrochloride using 4 - (2 - chloro-4-ethoxypheniamino)-7-trifluoromethylquinoline and 4-n-propylsulfonylbenzyl chloride.

EXAMPLE 13

7-methoyl-1-(3 - phenylpropyl) - 4 - (3,4,5 - tribromophenylimino)-1,4-dihydroquinoline hydrobromide using 7-methyl-4-(3,4,5 - tribromophenylamino)quinoline and 3-phenylpropyl bromide.

EXAMPLE 14

1-(4-biphenylylmethyl) - 7 - iodo - 4 - (4 - iodophenylimino)-1,4-dihydroquinoline hydrobromide using 7-iodo-4-(4-iodophenylamino)-quinoline and 4-biphenylylmethyl bromide.

EXAMPLE 15

1 - (4 - n - butylaminobenzyl) - 7 - chloro-4-(4-fluorophenylimino)-3-nitro-1,4-dihydroquinoline hydrobromide using 7 - chloro - 4 - (4-fluorophenylamino)-3-nitroquinoline and 4-n-butylaminobenzyl bromide.

EXAMPLE 16

7 - chloro - 1 - (2 - chlorobenzyl) - 4 - (1 - naphthylimino) - 1,4 - dihydroquinoline hydrochloride using 7-chloro-4-(1-naphthylamino)quinoline and 2-chlorobenzyl chloride.

EXAMPLE 17

4 - (4 - biphenylylimino) - 7 - chloro - 1 - (4-iodobenzyl)-1,4-dihydroquinoline hydriodide using 4-(4-biphenylylamino)-7-chloroquinoline and 4-iodobenzyl iodide.

EXAMPLE 18

7-chloro-4 - (2 - thienylimino) - 1 - (2-thienylmethyl)-1,4-dihydroquinoline hydrochloride using 7-chloro-4-(2-thienylamino)-quinoline and 2-thienylmethyl chloride.

EXAMPLE 19

7 - chloro - 1 - (2 - chlorobenzyl) - 4 - (2 - furylimino)-1,4-dihydroquinoline hydrochloride using 7-chloro-4-(2-furylamino)quinoline and 2-chlorobenzyl chloride.

EXAMPLE 20

7 - chloro - 4 - (5 - chloro - 2 - pyridylimino)- 1 - (2-furylmethyl)-1,4-dihydroquinoline hydrochloride using 7-chloro-4-(5-chloro-2-pyridylamino)quinoline and 2-furylmethyl chloride.

EXAMPLE 21

6,8-dichloro-1-(2 - naphthylmethyl) - 4 - phenylimino-1,4-dihydroquinoline hydrochloride using 6,8-dichloro-4-phenylaminoquinoline and 2-naphthylmethyl chloride.

EXAMPLE 22

7 - chloro - 4 - (4 - ethoxyphenylimino) - 1-(2-pyridylmethyl) - 1,4 - dihydroquinoline hydrochloride using 7-chloro-4-(4-ethoxyphenylamino)quinoline and 2-pyridylmethyl chloride.

EXAMPLE 23

7-chloro - 4 - (4-chlorophenylimino) - 1 - (2-pyrimidylmethyl)-1,4-dihydroquinoline hydrochloride using 7- chloro-4-(4-chlorophenylamino)quinoline and 2-pyrimidylmethyl chloride.

The compounds of Examples 2-23 inclusive are converted into their free base form by reaction with an acid-acceptor according to the procedure given in Example 24(B) for the conversion of 7-chloro-1-(2-chlorobenzyl)-4-(4 - methoxyphenylimino) - 1,4 - dihydroquinoline hydriodide into its corresponding free base by reaction with aqueous sodium hydroxide solution.

EXAMPLE 24

A. 1-[Aromatic-(Lower-Alkyl)]-4-Haloquinolinium Halides

The preparation of these intermediates is illustrated by the following preparation of 7-chloro-1-(2-chlorobenzyl)-4-iodoquinolinium iodide:

A reaction mixture containing 80 g. of 4,7-dichloroquinoline, 128 g. of 2-chlorobenzyl chloride, 177 g. of sodium iodide and 1200 cc. of acetone was refluxed for twenty-four hours with stirring. The reaction mixture was allowed to cool; and the resulting precipitate was collected and washed successively with acetone, water and acetone. There was thus obtained 130 g. (60% yield) of 7-chloro-1-(2-chlorobenzyl)-4-iodoquinolinium iodide, M.P. 208–209° C. (uncorr.).

Following the above procedure using an equivalent quantity of 4,5-dichloroquinoline in place of 4,7-dichloroquinoline, the product obtained was 5-chloro-1-(2-chlorobenzyl)-4-iodoquinolinium iodide, M.P. 201–202° C. with decomposition.

Analysis.—Calcd. for $C_{16}H_{10}Cl_2IN.HI$: C, 35.45; H, 2.04; I−, 23.42. Found: C, 35.28; H, 2.30; I−, 25.6.

Following the above procedure in the absence of sodium iodide, 4,7-dichloroquinoline and 2-chlorobenzyl chloride react to form 1-(2-chlorobenzyl)-4,7-dichloroquinolinium chloride; use of 4,7-dibromoquinoline and 2-bromobenzyl bromide in the absence of sodium iodide yields 1-(2-bromobenzyl)-4,7-dibromoquinolinium bromide.

Other 1-[aromatic-(lower-alkyl)] - 4 - haloquinolinium iodides that can be prepared following the above procedure using the appropriate 4-haloquinoline, aromatic-(lower-alkyl) halide and sodium iodide include: 3,7-dichloro-4-iodo-1-(3-nitrobenzyl)quinolinium iodide using 3,4,7-trichloroquinoline, 3-nitrobenzyl chloride and sodium iodide; 7-bromo-1-(2,4-dimethoxybenzyl)-4-iodoquinolinium iodide using 4,7-dibromoquinoline, 2,4-dimethoxybenzyl bromide and sodium iodide; 8-chloro-4-iodo-1-(2,4,6-trimethoxybenzyl)quinolinium iodide using 4,8-dichloroquinoline, 2,4,6-trimethoxybenzyl chloride and sodium iodide; 1-(3-ethylbenzyl)-4-iodo-7-trifluoromethylquinolinium iodide using 4-iodo-7-trifluoromethylquinoline, 3-ethylbenzyl chloride and sodium iodide; 4-iodo-7-methylmercapto - 1 - (2 - methylmercaptobenzyl)quinolinium iodide using 4-chloro-7-methylmercaptoquinoline, 2-methylmercaptobenzylchloride and sodium iodide; 7-chloro-1-[2-(4-chlorophenyl)ethyl] - 4 - iodo - 2 - methylquinolinium iodide using 4,7-dichloro-2-methylquinoline, 2-(4-chlorophenyl)ethyl chloride and sodium iodide; 1-(4-biphenylylmethyl)-7-chloro-4-iodoquinolinium iodide using 4,7-dichloroquinoline, 4-biphenylylmethyl chloride and sodium iodide; 7-chloro-4-iodo-1-(2-thienylmethyl)quinolinium iodide using 4,7-dichloroquinoline, 2-thienylmethyl chloride and sodium iodide; 7-chloro-1-(2-furylmethyl)-4-iodoquinolinium iodide using 4,7-dichloroquinoline, 2-furylmethyl chloride and sodium iodide; 7-chloro - 4 - iodo-1-(3-pyridylmethyl)quinolinium iodide using 4,7-dichloroquinoline, 3-pyridylmethyl chloride and sodium iodide; 7-chloro-4-iodo-1-(2-pyrimidylmethyl)quinolinium iodide using 4,7-dichloroquinoline, 2-pyrimidylmethyl chloride and sodium iodide; and the like.

B. 4-(Aromatic-Imino)-1-[Aromatic-(Lower-Alkyl)]-1,4-Dihydroquinolines

The preparation of these compounds by reacting a 1-[aromatic-(lower-alkyl)]-4-haloquinolinium halide with an aromatic-amine is illustrated by the following preparation of 7-chloro-1-(2-chlorobenzyl)-4-(4-methoxyphenylimino)-1,4-dihydroquinoline hydrochloride and corresponding base:

To a warm solution containing 3.2 g. of para-anisidine in 100 cc. of ethanol was added gradually 5.4 g. of 7-chloro - 1 - (2-chlorobenzyl) - 4 - iodoquinolinium iodide. Completion of the reaction was evidenced by the loss of the red color of the iodo compound. The reaction mixture was allowed to cool and the precipitate was collected, yielding 5.0 g. of 7-chloro-1-(2-chlorobenzyl)-4-(4 - methoxyphenylimino) - 1,4 - dihydroquinoline hydriodide. The hydriodide salt was dissolved in ethanol and treated with 10% aqueous sodium hydroxide solution to precipitate the imino base, which crystallized on addition of water with cooling. The solid product was recrystallized from ethanol to give 2.9 g. (71% yield) of 7-chloro-1-(2-chlorobenzyl) - 4 - (4-methoxyphenylimino)-1,4-dihydroquinoline, M.P. 145.0–148.0° C. (corr.).

Analysis.—Calcd. for $C_{23}H_{18}Cl_2N_2O$: Cl, 17.32; N, 6.86. Found: Cl, 17.42; N, 6.59.

7-chloro-1-(2-chlorobenzyl) - 4 - (4-methoxyphenylimino)-1,4-dihydroquinoline is converted into its hydrochloride salt by treating it in isopropyl alcohol solution with a solution of hydrogen chloride in ethanol until the solution is acidic, cooling the solution, and collecting the precipitated hydrochloride salt. By substitution of the hydrogen chloride in the preceding example with hydrogen bromide, phosphoric acid, sulfuric acid, tartaric acid, sulfamic acid or methanesulfonic acid, there can be obtained 7-chloro-1-(2-chlorobenzyl)-4-(4-methoxyphenylimino)-1,4-dihydroquinoline hydrobromide, phosphate, sulfate, tartrate, sulfamate or methanesulfonate, respectively.

Following the above procedure using 1-(2-chlorobenzyl)-4,7-dichloroquinolinium chloride in place of 7-chloro - 1 - (2-chlorobenzyl) - 4 - iodoquinolinium iodide, there is obtained directly 7-chloro-1-(2-chlorobenzyl)-4-(4 - methoxyphenylimino) - 1,4 - dihydroquinoline hydrochloride; using 4-bromo-7-chloro-1-(2-chlorobenzyl)quinolinium bromide, there is obtained 7-chloro-1-(2-chlorobenzyl)-4-(4 - methoxyphenylimino) - 1,4 - dihydroquinoline hydrobromide.

Other 4-(aromatic-imino)-1-[aromatic-(lower-alkyl)]-1,4-dihydroquinolines that can be prepared following the above procedure for the preparation of 7-chloro-1-(2-chlorobenzyl) - 4 - (4 methoxyphenylimino)-1,4-dihydroquinoline using the appropriate 1-[aromatic-(lower-alkyl)]-4-iodoquinolinium iodide and aromatic-amine include those given in Examples 25–35 inclusive.

EXAMPLE 25

3,7-dichloro - 4 - (2-naphthylimino)-1-(3-nitrobenzyl)-1,4-dihydroquinoline using 3,7-dichloro-4-iodo-1-(3-nitrobenzyl)quinolinium iodide and 2-naphthylamine.

EXAMPLE 26

4-(4-biphenylylimino)-7-bromo-1-(2,4 - dimethoxybenzyl)-1,4-dihydroquinoline using 7-bromo-1-(2,4-dimethoxybenzyl)-4-iodoquinolinium iodide and 4-biphenylylamine.

EXAMPLE 27

8-chloro-4-(2-thienylimino)-1 - (2,4,6 - trimethoxybenzyl)-1,4-dihydroquinoline using 8-chloro-4-iodo-1-(2,4,6-trimethoxybenzyl)quinolinium iodide and 2-thienylamine.

EXAMPLE 28

1-(3-ethylbenzyl)-4-(2-furylimino)-7 - trifluoromethyl-1,4-dihydroquinoline using 1-(3-ethylbenzyl)-4-iodo-7-trifluoromethylquinolinium iodide and 2-furylamine.

EXAMPLE 29

7-methylmercapto-1-(2 - methylmercaptobenzyl)-4-(2-pyridylimino)-1,4-dihydroquinoline using 4-iodo-7-methylmercapto - 1 - (2 - methylmercaptobenzyl)quinolinium iodide and 2-aminopyridine.

EXAMPLE 30

7-chloro-1-[2-(4-chlorophenyl)ethyl] - 2 - methyl-4-(2-pyrimidylimino)-1,4-dihydroquinoline using 7-chloro-1-[2-(4-chlorophenyl)ethyl]-4-iodo - 2 - methylquinolinium iodide and 2-aminopyrimidine.

EXAMPLE 31

1-(4-biphenylylmethyl)-7-chloro-4 - (4 - chlorophenylimino)-1,4-dihydroquinoline using 1-(4-biphenylylmethyl)-7-chloro-4-iodoquinolinium iodide and para-chloroaniline.

EXAMPLE 32

4-(4-n-butylphenylimino)-7-chloro-1 - (2 - thienylmethyl)-1,4-dihydroquinoline using 7-chloro-4-iodo-1-(2-thienylmethyl)quinolinium iodide and para-n-butylaniline.

EXAMPLE 33

7-chloro-1-(2-furylmethyl)-4-(2-iodophenylimino)-1,4-dihydroquinoline using 7 - chloro-1 - (2 - furylmethyl)-4-iodoquinolinium iodide and ortho-iodoaniline.

EXAMPLE 34

7-chloro-4-(2-nitrophenylimino)-1-(3 - pyridylmethyl)-1,4-dihydroquinoline using 7-chloro-4-iodo-1-(3-pyridylmethyl)quinolinium iodide and ortho-nitroaniline.

EXAMPLE 35

4-(3-bromophenylimino)-7-chloro-1-(2-pyrimidylmethyl)-1,4-dihydroquinoline using 7-chloro - 4 - iodo - 1 - (2-pyrimidylmethyl)quinolinum iodide and meta-bromoaniline.

The foregoing compounds of Examples 25–35 inclusive are first obtained as their hydriodide acid-addition salts and then converted into their respective free bases as in Example 24(B). The free bases can then be converted into other acid-addition salts, preferably their hydrochlorides.

EXAMPLE 36

4-(4-chlorophenylimino)-1-(2,4-dichlorobenzyl)-1,4-dihydroquinoline and its hydriodide can be obtained following the procedure described in Example 24(B) using 1-(2,4 - dichlorobenzyl) - 4 - iodoquinolinium iodide and para-chloroaniline.

EXAMPLE 37

7-chloro-1-(2-chlorobenzyl)-4-(4 - methylphenylimino)-1,4-dihydroquinoline hydrochloride can be obtained following the procedure described in Example 24(B) using 1-(2-chlorobenzyl)-4,7-dichloroquinolinium chloride and para-methylaniline.

EXAMPLE 38

7-bromo-1-(2 - bromobenzyl) - 4 - (4 - methoxyphenylimino)-1,4-dihydroquinoline hydrobromide can be obtained following the procedure described in Example 24(B) using 1-(2-bromobenzyl)-4,7-dibromoquinolinium bromide and para-anisidine.

EXAMPLE 39

*7-Chloro-1-(2-Chlorobenzyl) - 4 - (2,4 - Dichlorophenylimino)-1,4-Dihydroquinoline Hydrochloride*

Following the procedure described in Example 1(B) using 9 g. of 7-chloro-4-(2,4-dichlorophenylamino)quinoline, 18 g. of 2-chlorobenzyl chloride and 200 cc. of acetonitrile, there was obtained 5.8 g. of 7-chloro-1-(2-chlorobenzyl)-4-(2,4-dichlorophenylimino)-1,4 - dihydroquinoline hydrochloride, M.P. 165.6–172.4° C. (corr.) when recrystallized twice from ethanol.

*Analysis.*—Calcd. for $C_{22}H_{14}Cl_4N_2 \cdot HCl$: Cl, 7.32; N, 5.77. Found: Cl, 7.16; N, 5.63.

7-chloro-1,-(2-chlorobenzyl)-4 - (2,4 - dichlorophenylimino)-1,4-dihydroquinoline in free base form is obtained from the hydrochloride by reaction with aqueous sodium hydroxide solution following the procedure described above in Example 24(B).

EXAMPLE 40

*7-Chloro-1-(2-Chlorobenzyl)-4-(2 - Chlorophenylimino)-1,4-Dihydroquinoline Hydrochloride*

This compound was prepared following the procedure described in Example 1(B) using 10 g. of 7-chloro-4-(2-chlorophenylamino)quinoline, 22.2 g. of 2-chlorobenzyl chloride and 200 cc. of acetonitrile. There was thus obtained 7.9 g. of 7-chloro-1-(2-chlorobenzyl)-4-(2-chlorophenylimino) - 1,4 - dihydroquinoline hydrochloride, M.P. 261.2–269.4° C. (corr.) when recrystallized once from ethanol.

*Analysis.*—Calcd. for $C_{22}H_{15}Cl_3N_2 \cdot HCl$: Cl, 31.51; N, 6.22. Found: Cl, 31.83; N, 6.20.

7-chloro-1-(2-chlorobenzyl)-4-(2 - chlorophenylimino)-1,4-dihydroquinoline in free base form is obtained by reaction of the hydrochloride with aqueous sodium hydroxide solution according to the procedure described in Example 24(B).

EXAMPLE 41

*7-Chloro-1-(2-Chlorobenzyl)-4-(4-Hydroxyphenylimino)-1,4-Dihydroquinoline Hydrochloride*

A mixture containing 5.4 g. of 7-chloro-1-(2-chlorobenzyl)-4-iodoquinolinium iodide, 5.5 g. of para-aminophenol and 200 cc. of ethanol was heated. After the quinolinium iodide had dissolved, there was obtained a clear red solution which was allowed to cool slowly to room temperature. The product that separated was collected to give 3.1 g. of 7-chloro-1-(2-chlorobenzyl)-4-(4-hydroxyphenylimino) - 1,4 - dihydroquinoline hydriodide, M.P. 257–258° C.

The above hydriodide salt was converted into the corresponding hydrochloride salt by dissolving it in ethanol-water with warming and passing the resulting solution rapidly through 40 g. of an ion-exchange resin saturated with chloride ions (such as Amberlite® IRA–400 ion-exchange resin supplied by Rohm & Haas Co.). The orange filtrate was then slowly passed through another 40 g. portion of the ion-exchange resin. The resulting orange solution was concentrated and the resulting yellow precipitate was collected and dried overnight at 60° C. at 1 mm. to yield 3 g. of 7-chloro-1-(2-chlorobenzyl)-4-(4-hydroxyphenylimino) - 1,4 - dihydroquinoline hydrochloride, M.P. >300° C. (corr.).

*Analysis.*—Calcd. for $C_{22}H_{16}Cl_2N_2O \cdot HCl$: Cl, 8.22; N, 6.49. Found: Cl, 8.08; N, 6.19.

The hydrochloride salt is converted into the corresponding imino base, 7-chloro-1-(2 - chlorobenzyl) - 4 - (4 - hydroxyphenylimino)-1,4-dihydroquinoline, by treating an ethanol solution of the salt with 10% aqueous sodium hydroxide solution according to the procedure given in Example 24(B).

EXAMPLE 42

*7-Chloro-1-(2-Chlorobenzyl)-4-(2-Pyridylimino)-1,4-Dihydroquinoline*

This preparation was carried out following the procedure described in Example 24(B) using 16.3 g. of 7-chloro-1-(2-chlorobenzyl)-4-iodoquinolinium iodide, 8.5 g. of 2-aminopyridine and 400 cc. of methanol. There was first obtained 7 g. of product which was recrystallized from methanol (plus a small amount of water) to yield 7-chloro-1-(2-chlorobenzyl)-4-(2-pyridylimino) - 1,4 - dihydroquinoline hydriodide, M.P. 252–253° C.

*Analysis.*—Calcd. for $C_{21}H_{15}Cl_2N_3 \cdot HI$: N, 8.26; I, 24.85. Found: N, 8.18; I, 24.94.

Following the procedure described in Example 24(B) using 10.2 g. of 7-chloro-1-(2-chlorobenzyl)-4-(2-pyridylimino)-1,4-dihydroquinoline hydriodide, 20 cc. of 35% aqueous sodium hydroxide solution and 200 cc. of methanol there was obtained 3.5 g. of 7-chloro-1-(2-chlorobenzyl)-4-(2-pyridylimino) - 1,4 - dihydroquinoline, M.P. 172.8–174.2° C. (corr.) when recrystallized from isopropyl alcohol.

*Analysis.*—Calcd. for $C_{21}H_{15}Cl_2N_3$: Cl, 18.64; N, 11.02. Found: Cl, 18.66; N, 11.22.

EXAMPLE 43

7-Chloro-1-(2-Chlorobenzyl)-4-(3-Pyridylimino)-1,4-Dihydroquinoline

This preparation was carried out following the procedure described in Example 24(B) using 27.1 g. of 7-chloro-1-(2-chlorobenzyl) - 4 - iodoquinolinium iodide, 14.1 g. of 3-aminopyridine and 300 cc. of isopropyl alcohol. There was first obtained 7-chloro-1-(2-chlorobenzyl)-4-(3-pyridylimino)-1,4-dihydroquinoline hydriodide which was then converted into 7-chloro-1-(2-chlorobenzyl)-4-(3-pyridylimino) - 1,4 - dihydroquinoline, M.P. 174.4–176.4° C. (corr.) when recrystallized twice from methanol.

*Analysis.*—Calcd. for $C_{21}H_{15}Cl_2N_3$: Cl, 18.64; N, 11.04. Found: Cl, 18.68; N, 10.92.

EXAMPLE 44

7-Chloro-1-(2-Chlorobenzyl)-4-(2-Pyrimidylimino)-1,4-Dihydroquinoline

This preparation was carried out following the procedure described in Example 24(B) using 27.1 g. of 7-chloro-1-(2-chlorobenzyl) - 4 - iodoquinolinium iodide, 14.2 g. of 2-aminopyrimidine and 200 cc. of isopropyl alcohol. There was first obtained 7-chloro-1-(2-chlorobenzyl)-4-(2-pyrimidylimino)-1,4-dihydroquinoline hydriodide which was then converted into 7-chloro-1-(2-chlorobenzyl)-4-(2-pyrimidylimino)-1,4-dihydroquinoline, M.P. 214.8–219.4° C. (corr.) when recrystallized once from isopropyl alcohol, once from ethanol and once from chloroformacetone.

*Analysis.*—Calcd. for $C_{20}H_{14}Cl_2N_4$: Cl, 18.60; N, 14.70. Found: Cl, 18.57; N, 14.60.

EXAMPLE 45

7-Chloro-1-(2-Chlorobenzyl)-4-(4-Dimethylaminophenylimino)-1,4-Dihydroquinoline This preparation was carried out following the procedure described in Example 41 using 10 g. of 7-chloro-1-(2-chlorobenzyl)-4-iodoquinolinium iodide, 9.6 g. of 4-dimethylaminoaniline hydrochloride, 2.22 g. of sodium hydroxide and 75 cc. of ethanol. There was first obtained 7-chloro-1-(2-chlorobenzyl)-4-(4 - dimethylaminophenylimino)-1,4-dihydroquinoline hydriodide which was then converted into the corresponding hydrochloride salt by treatment with an ion-exchange resin saturated with chloride ions as illustrated in Example 41. The hydrochloride salt was then dissolved in hot ethanol and the ethanol solution was made strongly basic with 5% aqueous sodium hydroxide solution. The alkaline solution when cooled yielded a precipitate which was recrystallized from benzene-n-hexane to yield 3.1 g. of product, 7-chloro-1-(2-chlorobenzyl)-4-(4-dimethylaminophenylimino) - 1,4 - dihydroquinoline, M.P. 206.4–209.4° C. (corr.).

*Analysis.*—Calcd. for $C_{14}H_{21}Cl_2N_3$: Cl, 16.79; N, 9.95. Found: Cl, 16.66; N, 9.89.

4-(aromatic - imino)-1-[aromatic - (lower-alkyl)] - 1,4-dihydroquinolines and acid-addition salts of the foregoing examples when administered orally to hamsters infected with *Endamoeba criceti* were found to completely clear the animals at drug levels below 200 mg. per kg. of body weight per day. Some of the compounds, for instance, 7-chloro-1-(2-chlorobenzyl)-4-(4 - methoxyphenylimino)-1,4-dihydroquinoline and 7-chloro - 1 - (2 - chlorobenzyl)-4-(2-chlorophenylimino)-1,4-dihydroquinoline hydrochloride, have $ED_{50}$ values below 50 mg. per kg. per day, $ED_{50}$ meaning the effective dose necessary to clear 50% of the hamsters of the amebic infection.

My new 4 - (aromatic - imino) - 1 - [aromatic - (loweralkyl)]-1,4-dihydroquinolines and acid-addition salts are best administered orally in solid form with the aid of a carrier. Thus, the compounds can be formulated in unit dosage form as tablets in combination with an adjuvant such as one or more of the following: calcium carbonate, starch, gelatin, talc, magnesium stearate, acacia, and the like; or, alternatively, they can be employed in capsule form either alone or admixed with an adjuvant. My compounds also can be advantageously combined with other amebacides, such as N-(2,4-dichlorobenzyl)-N-(2-hydroxyethyl)dichloroacetamide, when desired. Illustrative of a tablet formulation of my compounds is one weighing 660 mg. and containing 500 mg. of 7-chloro-1-(2-chlorobenzyl) - 4 - (4-methoxyphenylimino) - 1,4-dihydroquinoline, 25 mg. of calcium carbonate as a diluent, 90 mg. of starch as a disintegrator, 30 mg. of gelatin as a binder and 15 mg. of talc as a lubricant. Illustrative of a capsule formulation is one containing 500 mg. of 7-chloro-1-(2-chlorobenzyl)-4-(2-chlorophenylimino)-1,4 - dihydroquinoline hydrochloride, 40 mg. of starch and 10 mg. of talc. Other tablet and capsule formulations can be made varying the quantities of adjuvants or using other 4-(aromatic-imino)-1-[aromatic-(lower - alkyl)] - 1,4 - dihydroquinolines or acid-addition salts as active amebacidal ingredients.

I claim:

1. A composition of matter selected from the group consisting of: (a) the 1-[aromatic-(lower-alkyl)]-4-(aromatic - imino) - 1,4 - dihydroquinoline having the formula

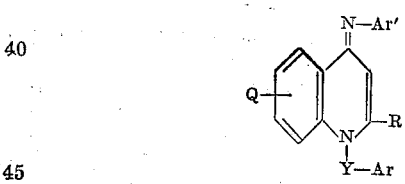

where Q is selected from the group consisting of H and from one to two substituents at positions 3, 5, 6, 7 and 8 of the quinoline nucleus selected from the group consisting of halo, lower-alkoxy, lower-alkylmercapto, lower-alkyl, nitro and trifluoromethyl, Ar' and Ar are each selected from the group consisting of phenyl, naphthyl, biphenyl, thienyl, furyl, pyridyl, pyrimidyl and substituted-phenyl having from one to three substituents selected from the group consisting of halo, nitro, lower-alkoxy, hydroxy, lower-alkyl, lower-alkylmercapto, lower-alkylsulfonyl, trifluoromethyl, lower-alkylamino, di-(lower-alkyl)amino and lower-acylamino, R is a member selected from the group consisting of H and lower-alkyl, and Y is lower-alkylene; and, (b) acid-addition salts thereof.

2. The 1 - arylmethyl-4-arylimino-7-halo-1,4-dihydroquinoline having the formula

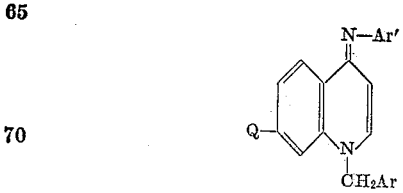

where Q is halo, and Ar is halogenated-phenyl and Ar' is (lower-alkoxylated)-phenyl.

3. Acid-addition salt of the compound of the formula

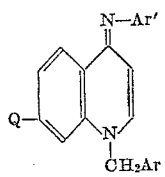

where Q is halo, and Ar and Ar' are each halogenated-phenyl.
4. 7-chloro-1-(2-chlorobenzyl)-4-(4 - methoxyphenyl-imino)-1,4-dihydroquinoline.
5. 7-chloro-1-(2-chlorobenzyl) - 4 - (4 - chlorophenyl-imino)-1,4-dihydroquinoline hydrochloride.
6. 7-chloro-1-(2-chlorobenzyl) - 4 - (2 - chlorophenyl-imino)-1,4-dihydroquinoline hydrochloride.
7. 7-chloro-1-(2-chlorobenzyl)-4-(4 - hydroxyphenyl-imino)-1,4-dihydroquinoline hydrochloride.
8. 7-chloro-1-(2-chlorobenzyl) - 4 - (2,4 - dichloro-phenylimino)-1,4-dihydroquinoline hydrochloride.
9. 7-chloro-1-(2-chlorobenzyl) - 4 - (3-pyridylimino)-1,4-dihydroquinoline.
10. 7-chloro-1-(2-chlorobenzyl)-4-(2 - pyridylimino)-1,4-dihydroquinoline.
11. 7-chloro-1-(2-chlorobenzyl) - 4 - (2 - pyrimidyl-imino)-1,4-dihydroquinoline.
12. A process for the preparation of the acid-addition salt of the 1-[aromatic-(lower-alkyl)]-4-(aromatic-imino)-1,4-dihydroquinoline having the formula

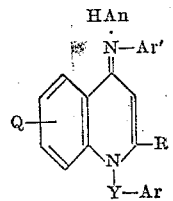

where Q is selected from the group consisting of H and from one to two substituents at positions 3, 5, 6, 7 and 8 of the quinoline nucleus selected from the group consisting of halo, lower-alkoxy, lower-alkylmercapto, lower-alkyl, nitro and trifluoromethyl, Ar' and Ar are selected from the group consisting of phenyl, naphthyl, biphenylyl, thienyl, furyl, pyridyl, pyrimidyl and substituted-phenyl having from one to three substituents selected from the group consisting of halo, nitro, lower-alkoxy, hydroxy, lower-alkyl, lower-alkylmercapto, lower-alkylsulfonyl, trifluoromethyl, lower-alkylamino, di-(lower-alkyl)amino and lower-acylamino, R is a member selected from the group consisting of H and lower-alkyl, Y is lower-alkylene and An is an anion of a strong acid, which comprises reacting the corresponding 4-(aromatic-amino)-quinoline having the formula

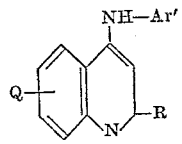

where Q, Ar' and R have the meanings already designated, with an ester having the formula Ar—Y—An.
13. A process for the preparation of the acid-addition salt of the 1-arylmethyl-4-arylimino-7-halo-1,4-dihydro-quinoline having the formula

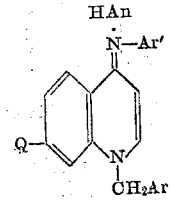

where Q is halo, An is the anion of a strong acid, Ar' and Ar are each halogenated-phenyl, which comprises reacting the corresponding 4-arylamino-7-haloquinoline with an ester having the formula ArCH₂—An.
14. A process for the preparation of a hydrohalide of the 1-[aromatic-(lower-alkyl)]-4-(aromatic-imino)-1,4-dihydroquinoline having the formula

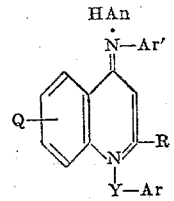

where Q is selected from the group consisting of H and from one to two substituents at positions 3, 5, 6, 7 and 8 of the quinoline nucleus selected from the group consisting of halo, lower-alkoxy, lower-alkylmercapto, lower-alkyl, nitro and trifluoromethyl, Ar' and Ar are each aromatic radicals selected from the group consisting of phenyl, naphthyl, biphenylyl, thienyl, furyl, pyridyl and pyrimidyl radicals, R is a member selected from the group consisting of H and lower-alkyl, Y is lower-alkylene and An is a halide ion, which comprises reacting a 4-halo-quinolinium halide having the formula

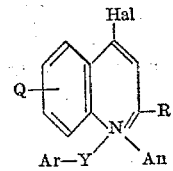

where Q, R, Y and Ar have the meanings already given and Hal is a member selected from the group consisting of chloro, bromo and iodo, with an aromatic-amine having the formula Ar'—NH₂.
15. A process for the preparation of the compound having the formula

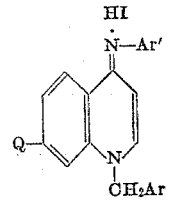

where Q is halo and Ar' and Ar are each monocarbo-cyclic-aryl having six ring-carbon atoms, which comprises reacting a 4-iodoquinolinium iodide having the formula

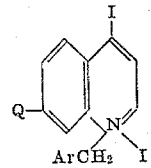

with an aryl-amine having the formula Ar'—NH₂.
16. A process for the preparation of the compound having the formula

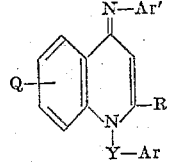

where Q is selected from the group consisting of H and from one to two substituents at positions 3, 5, 6, 7 and 8 of the quinoline nucleus selected from the group consisting of halo, lower-alkoxy, lower-alkylmercapto, lower-alkyl, nitro and trifluoromethyl, Ar' and Ar are each selected from the group consisting of phenyl, naphthyl, biphenylyl, thienyl, furyl, pyridyl, pyrimidyl and substituted-phenyl having from one to three substituents selected from the group consisting of halo, nitro, lower-alkoxy, hydroxy, lower-alkyl, lower-alkylmercapto, lower-alkylsulfonyl, trifluoromethyl, lower-alkylamino, di-(lower-alkyl)amino and lower-acylamino, R is a member selected from the group consisting of H and lower-alkyl and Y is lower-alkylene, which comprises reacting the corresponding acid-addition salt with an acid-acceptor.

17. A process for the preparation of the compound having the formula

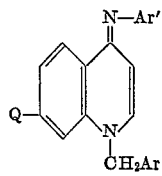

where Q is halo, and Ar' and Ar are each halogenated-phenyl, which comprises reacting the corresponding acid-addition salt with an acid-acceptor.

References Cited in the file of this patent
UNITED STATES PATENTS

| | | |
|---|---|---|
| 2,554,737 | Haefliger et al. | May 29, 1951 |
| 2,681,910 | Burckhalter | June 22, 1954 |

OTHER REFERENCES

Chemical Abstracts, vol. 24, pages 5753–5754 (1930); abstract of Mikhailenko et al., J. Russ Phys. Chem. Soc., vol. 61, pages 2267–77 (1929).

Elderfield: Heterocyclic Compounds, vol. 4, pages 167–170, John Wiley and Sons (1952).

Gopalchari: Chem. Abstracts, vol. 49, p. 3967 (1955), citing contribution of J. Sci. Ind. Research (India), 13B pp. 15–20 (1954).

Schock: Journal American Chem. Soc., vol. 79 (1957), pp. 1670–72.

UNITED STATES PATENT OFFICE
CERTIFICATE OF CORRECTION

Patent No. 3,075,981                                  January 29, 1963

Alexander R. Surrey

It is hereby certified that error appears in the above numbered patent requiring correction and that the said Letters Patent should read as corrected below.

Column 1, line 9, for "relatse" read -- relates --; line 71, for "-CH(CH$_3$(CH$_2$CH$_2$-" read -- -CH(CH$_3$)CH$_2$CH$_2$- --; column 2, line 53, for "means" read -- meanings --; column 4, lines 4 to 12, the upper portion of formula IIb should appear as shown below instead of as in the patent:

same column 4, line 47, for "-4-(-chlorophenyl-" read -- -4-(3-chlorophenyl- --; column 5, line 2, for "warning" read -- warming --; lines 34 and 35, for "iodiquinolinium" read -- iodoquinolinium --; line 36, for "hydroidide" read -- hydriodide --; line 39, for "hydroiodide" read -- hydriodide --; same column 5, line 72, for "for", first occurrence, read -- at --; column 6, line 42, for "-(4-n-propylaminophenyl)" read -- -(4-n-propylaminophenylamino) --; line 63, for "-(2-chlorobenzyl-4-" read -- -(2-chlorobenzyl)-4- --; column 7, line 10, for "7-chloro-1,(2-" read -- 7-chloro-1-(2- --; column 8, line 14, for "-(2 —chloro-4-ethoxyphenlamino)-" read ---(2-chloro-4-ethoxyphenylamino)- --; line 19, for "7-methoyl-" read -- 7-methyl- --; column 12, line 5, for "7-chloro-1,-" read -- 7-chloro-1- --; column 13, line 68, for "C$_{14}$H$_{21}$Cl$_2$N$_3$:" read -- C$_{24}$H$_{21}$Cl$_2$N$_3$: --; column 14, line 53, for "biphenyl" read -- biphenylyl --; column 15, lines 56 to 60, the formula should appear as shown below instead of as in the patent:

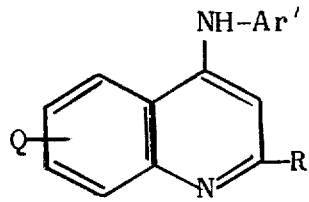

3,075,981 column 16, lines 9 to 15, the formula should appear as shown below instead of as in the patent:

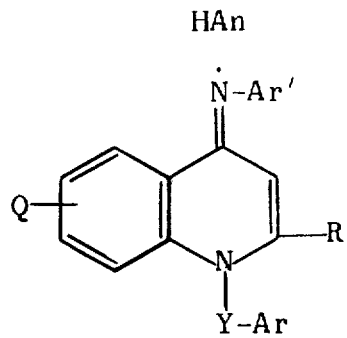

Signed and sealed this 29th day of October 1963.

(SEAL)
Attest:

ERNEST W. SWIDER
Attesting Officer

EDWIN L. REYNOLDS
Acting Commissioner of
Patents